(12) United States Patent
De Froment

(10) Patent No.: US 7,693,107 B2
(45) Date of Patent: Apr. 6, 2010

(54) WLAN HANDOVER FOR A MOBILE TERMINAL MOVING FROM A FIRST TO A SECOND NETWORK

(75) Inventor: Eric De Froment, Ostermuendigen (CH)

(73) Assignee: Swisscom Mobile AG, Berne (CH)

( * ) Notice: Subject to any disclaimer, the term of this patent is extended or adjusted under 35 U.S.C. 154(b) by 246 days.

(21) Appl. No.: 10/592,489

(22) PCT Filed: Mar. 18, 2005

(86) PCT No.: PCT/EP2005/051272

§ 371 (c)(1),
(2), (4) Date: Sep. 12, 2006

(87) PCT Pub. No.: WO2005/091564

PCT Pub. Date: Sep. 29, 2005

(65) Prior Publication Data

US 2007/0218888 A1   Sep. 20, 2007

(30) Foreign Application Priority Data

Mar. 19, 2004   (EP) .................................. 04101146

(51) Int. Cl.
*H04W 4/00*   (2009.01)
*H04W 36/00*   (2009.01)

(52) U.S. Cl. ................. 370/331; 455/432.1; 455/432.3; 455/433; 455/438; 455/439

(58) Field of Classification Search ................. 370/331, 370/338; 455/436, 440, 432.1, 432.3, 433, 455/438
See application file for complete search history.

(56) References Cited

U.S. PATENT DOCUMENTS 5,159,592 A * 10/1992 Perkins ....................... 370/338

(Continued)

FOREIGN PATENT DOCUMENTS

WO    WO 03/034683 A1    4/2003

OTHER PUBLICATIONS

Schulzrinne et al. "Application-Layer Mobility Using SIP", Nov. 2000, Mobile Computing and Communications Review, vol. 1, No. 2.*

(Continued)

*Primary Examiner*—Rafael Pérez-Gutiérrez
*Assistant Examiner*—Allahyar Kasraian
(74) *Attorney, Agent, or Firm*—Oblon, Spivak, McClelland, Maier & Neustadt, L.L.P.

(57) ABSTRACT

A method, a system, and a local network switching device for providing access for a mobile communication terminal and the mobile communication terminal at a moved location to an Internet network via wireless local networks. The mobile communication terminal is moved from a first network to a second network. The WLAN handover, necessary therefore, takes place efficiently and in a robust manner, by providing access for the mobile communication terminal in the first network, by transmitting a device-specific address to a plurality of bordering networks, and by configuring further accesses on the plurality of bordering networks. After moving the mobile communication terminal, access to an Internet network can be continued immediately via the second network, via the local network switching unit of the second network, and via the local network switching unit of the first network.

19 Claims, 4 Drawing Sheets

U.S. PATENT DOCUMENTS

| | | | |
|---|---|---|---|
| 5,943,332 A * | 8/1999 | Liu et al. | 370/342 |
| 6,418,130 B1 * | 7/2002 | Cheng et al. | 370/331 |
| 6,577,868 B1 | 6/2003 | Vialen et al. | |
| 6,771,609 B1 * | 8/2004 | Gudat et al. | 370/254 |
| 6,957,262 B2 * | 10/2005 | Kimura et al. | 709/227 |
| 6,975,864 B2 * | 12/2005 | Singhal et al. | 455/438 |
| 7,058,059 B1 * | 6/2006 | Henry et al. | 370/395.1 |
| 7,313,631 B1 * | 12/2007 | Sesmun et al. | 709/245 |
| 7,346,039 B2 * | 3/2008 | Oishi | 370/338 |
| 2001/0049729 A1 * | 12/2001 | Carolan et al. | 709/220 |
| 2002/0085719 A1 | 7/2002 | Crosbie | |
| 2002/0105931 A1 * | 8/2002 | Heinonen et al. | 370/338 |
| 2002/0176383 A1 * | 11/2002 | Inoue et al. | 370/331 |
| 2003/0002468 A1 * | 1/2003 | Khalil et al. | 370/338 |
| 2003/0003912 A1 * | 1/2003 | Melpignano et al. | 455/436 |
| 2003/0021254 A1 * | 1/2003 | Fukuda | 370/338 |
| 2003/0185172 A1 | 10/2003 | Rue | |
| 2003/0195002 A1 * | 10/2003 | Singhal et al. | 455/436 |
| 2003/0225892 A1 | 12/2003 | Takusagawa et al. | |
| 2004/0122976 A1 * | 6/2004 | Dutta et al. | 709/245 |
| 2004/0203596 A1 * | 10/2004 | Sreemanthula et al. | 455/411 |
| 2004/0203752 A1 * | 10/2004 | Wojaczynski et al. | 455/432.1 |
| 2004/0218575 A1 * | 11/2004 | Ibe et al. | 370/338 |
| 2004/0221042 A1 * | 11/2004 | Meier | 709/227 |
| 2005/0152305 A1 * | 7/2005 | Ji et al. | 370/328 |
| 2005/0195822 A1 * | 9/2005 | Lim et al. | 370/393 |
| 2005/0213545 A1 * | 9/2005 | Choyi et al. | 370/338 |
| 2006/0079233 A1 * | 4/2006 | Watanabe et al. | 455/436 |
| 2006/0092888 A1 * | 5/2006 | Jeong et al. | 370/338 |

OTHER PUBLICATIONS

Perkins, "IP Mobility Support", Oct. 1996, Internet Engineering Task Force (IETF), RFC 2002.*

* cited by examiner

WLAN HANDOVER FOR A MOBILE TERMINAL MOVING FROM A FIRST TO A SECOND NETWORK

BACKGROUND OF THE INVENTION (1) Field of the Invention

The present invention relates to a method, a system and a local network switching unit for providing access for a mobile communication terminal and the moved mobile communication terminal to an Internet network via wireless local networks. The invention relates in particular to a method and system for the efficient handover of the access to an Internet network to a mobile communication terminal which is moved from a first wireless local network to a further wireless local network.

(2) Description of the Related Art

Wireless local networks, so-called Wireless Local Area Networks (WLAN), serve as communication systems for communicating with other communication units for users with mobile communication terminals. Wireless local networks are used primarily as access networks for access to a fixed network, and in particular for access to the Internet. In a WLAN, data are transmitted in each case via an air interface. Data are thereby transmitted from one point to another by means of electromagnetic waves, in particular radio or infrared waves. A typical WLAN comprises at least one point of access, or so-called Access Point (AP), and at least one wireless communication terminal, for example a laptop or palmtop computer, for instance a so-called Personal Data Assistant (PDA), or a mobile telephone. An access point comprises at least one transmitter/receiver and an antenna for data exchange with the wireless communication terminals via an air interface. A device configuration embodying such an access point will be designated in this text as an access point unit. An access point unit is normally assigned a local network switching unit, which local network switching unit is typically connected to the access point unit via a physical network. A local network switching unit has the task, among others, of enabling network connections between the communication terminals existing in a wireless local network and further communication terminals connected to the local network switching unit. However, a local network switching unit can also enable e.g. network connections between the communication terminals existing in a wireless local network. Local network switching unit and access point unit can be combined into a single device. Such a device will be designated in this text as a switching device. An access point unit is normally set up at a fixed location, data being able to be exchanged only with communication terminals located within the range of this access point unit. The range of an access point unit depends upon various factors such as the access point unit itself, the environment and the mobile communication terminal. To enable access via wireless local networks in a larger area, a corresponding number of access point units are distributed over this larger area in such a way that a mobile communication terminal has access to at least one of the access point units from as many points as possible of this larger area. For a mobile communication terminal moving out of the range of a first access point unit into the range of a second access point unit, the access of the mobile communication terminal must be switched over from the first access point unit to the second access point unit. This switching step is also designated as a "WLAN handover," whereby, in other words, the changeover takes place from the first wireless local network, assigned to the first access point unit, to the second wireless local network, assigned to the second access point unit. A WLAN handover must be carried out as efficiently as possible, it being meant by efficient that the access of the mobile communication terminal may not be interrupted, or only as briefly as possible. An efficient WLAN handover is of especially great importance for applications such as IP (Internet Protocol) telephony. For efficient WLAN handovers there exist at the present time only solutions for wireless local networks within locally limited zones, in particular for wireless local networks of a locally limited zone of the same network provider, especially for wireless local networks inside the same building or building complex. An efficient WLAN handover between, for example, wireless local networks spread out over larger geographic regions or between different network providers, is, on the other hand, an unsolved problem. Apart efficiency, a WLAN handover should take place in an as robust manner as possible. Robustness of a WLAN handover is partly connected to efficiency of a WLAN handover. When a mobile terminal is just on the border of the ranges of two different access points, it may become difficult to decide which of these access points shall be used. This may lead to a situation where the mobile terminal connects to the first access point, then detects a better signal quality of the second access point and therefore starts to register to the second access point. While establishing a connection to the second access point, the signal quality for the first access point may have increased again and the mobile terminal may therefore start again to register with the first access point. If efficiency of a WLAN handover is low, also robustness for connecting to a WLAN in such a situation as is low. Robustness may be even more degraded due to the fact that some central server behind the access points has to manage connections from the mobile terminal to the Internet. For managing such connections, rerouting of data streams may be necessary. However, when a mobile terminal switches its registration between different access points back and forth, the design of a robust central server for managing connections from the mobile terminal to the Internet becomes a difficult task. A further disadvantage in the state of the art is handling of a WLAN handover between different network providers. In the state of the art, when a mobile terminal moves from an access point of a first network provider to the access point of a second network provider, the mobile terminal has to be fully registered to the network provider again. Even if different network providers would like to share access points in between each other, such that customers of a first network provider may benefit from network resources of a second network provider, such a sharing of access points is not possible in the state of the art.

The document RFC 2002, October 1996, (the document is also known as "Mobile IP") of the Internet Engineering Task Force (IETF) describes a protocol for access to the Internet for mobile nodes. A mobile node thereby has two IP addresses. The first IP address is the so called home address, which is assigned to the mobile node in a fixed way. The second IP address is the so-called care-of address, which is newly assigned again in each case during a change from a first physical network to a further physical network. The home address is made known to the Internet by a so-called home agent. Data which are intended for the mobile node are first sent to the home agent, who forwards these data to the current care-of address of the mobile node. Mobile IP makes it possible for a mobile node to be able to switch between physical networks of the same kind (such as e.g. from a first ether network to a further ether network) as well as to be able to switch between physical networks of a different kind (such as e.g. from an ether network to a WLAN). With mobile IP a mobile node can also switch from a first wireless local network to a further wireless local network, a change between different network providers also being possible. With mobile IP it is not possible, however, to achieve a sufficiently efficient WLAN handover. With mobile IP it is also not possible to provide a robust WLAN handover. And finally, with mobile IP it is also not possible that network providers may share network resources in between each other.

In "Application-Layer Mobility Using SIP" (ACM SIG-MOBILE Mobile Computing and Communications Review, Volume 4, Number 3, 2000, 47-57), Schulzrinne et al. have proposed a SIP (Session Initiation Protocol) based handover. A mobile node receives a beacon when it enters the radio range of a new WLAN base station. The mobile node initiates a discovery protocol for receiving a new IP address and invites the calling host to this new address. Schulzrinne et al. consider SIP-based mobility to be less suitable for TCP-based applications. With SIP based handover, however, it is not possible to provide for a sufficiently efficient WLAN handover. It is as well not possible to provide for a robust WLAN handover. And finally, with SIP based handover it is also not possible that network providers may share network resources in between each other.

The patent application US 2003/0185172 discloses a method for supporting mobility of a mobile node between access points of a WLAN (wireless local access network). The method is initiated by moving the mobile node from a first WLAN, where the mobile node currently is connected, to a second WLAN. After moving the mobile node, a message containing the mobile nodes medium access control (MAC) address is broadcasted by a second access server of the second WLAN. A first access server of the first WLAN receives the broadcasted message and sends a message containing the Internet protocol address of the mobile node to the second access server. Data routing to and from the mobile node is then established via the second access server via the first access server to the Internet. A disadvantage of the method according to US 2003/0185172 is that a sufficiently efficient WLAN handover is difficult to achieve. It is also a disadvantage that robustness of a WLAN handover cannot be achieved. When the mobile node moves from a first network provider to a second network provider, it is a disadvantage that the mobile node has to be newly registered to the second network provider.

BRIEF SUMMARY OF THE INVENTION

It is the object of the present invention to propose a new method and system for providing the access of a mobile communication terminal and the moved mobile communication terminal to an Internet network via wireless local networks, the access of the mobile communication terminal being provided by a first wireless local network and further wireless local networks, which method and system do not have the drawbacks of the prior art.

These objects are achieved according to the present invention through the elements of the independent claims. Further preferred embodiments follow moreover from the dependent claims and from the specification.

The above-mentioned objects are achieved through the present invention in that the mobile communication terminal is registered in a first Internet switching unit via a first access point unit of a first wireless local network and via a first local network switching unit (SW1) connected to the first access point unit, in that a first Internet address is transmitted from the first Internet switching unit to the mobile communication terminal, in that a first access for the mobile communication terminal to the Internet network is provided, using the first Internet address, whereas the first access is via the first access point unit, via the first local network switching unit, and via the first Internet switching unit, in that in the first local network switching unit a device-specific address of the mobile communication terminal is registered, in that the registered device-specific address and a network identification for the first wireless local network is transmitted from the first local network switching unit to a plurality of bordering further local network switching units, and in that the plurality of bordering further local network switching units are configured for providing a plurality of further accesses for the mobile communication terminal at a moved location to the Internet network using the first Internet address, whereas the plurality of further accesses is via a plurality of further access point units and corresponding further bordering local network switching units, via the first local network switching unit and via the first Internet switching unit. Such wireless local networks and such a mobile communication terminal have the advantage that access to an Internet network for a mobile communication terminal can be achieved with an efficient WLAN handover also for spread-out wireless networks. Since a device-specific address for the mobile communication terminal is registered in the first local network switching unit, and this registered address is transmitted together with a network identification for the first wireless local network to bordering further local network switching units, sufficient information exists—with the network identification and the device-specific address—at the point in time of movement of the mobile communication terminal to a new location of a bordering second access point unit, at the second local network switching unit, assigned to this second access point unit, such that data may be instantly exchanged between the mobile communication terminal, the second local network switching unit, the first local network switching unit and an Internet network. Through this method, a robust and efficient WLAN handover is achieved. Moreover, deployment of local network switching units can be easily performed.

In an embodiment variant, routing in the first local network switching unit of data packets from the Internet network to the first access or to the further accesses is adapted according to data packets of the mobile terminal or the moved mobile terminal received from the first access to the Internet network or from the further accesses to the Internet network. Such an embodiment variant has the advantage that routing of data packets towards the mobile terminal is efficiently adaptable to the current location of the mobile terminal.

In an embodiment variant, during registration of the network identification and of the device-specific address of the mobile communication terminal, network connections are also established between the current wireless local network of the mobile communication terminal and bordering further wireless local networks. This embodiment variant has the advantage, among other things, that after movement of the mobile communication terminal an initialized network connection is already established between the second local network switching unit and the first local network switching unit, whereby an even more efficient WLAN handover can be achieved.

In a further embodiment variant, after the WLAN handover according to the invention, the mobile communication terminal will be assigned a second Internet address from the second Internet switching unit assigned to the second local network switching unit; a device-specific address will be registered and will be transmitted together with a network identification for the second local network switching unit to bordering further local network switching units, and access for the mobile communication terminal to the Internet will be provided via the second access point unit using the second Internet address. This embodiment variant has the advantage, among other things, that the mobile communication terminal uses an Internet address assigned to the second wireless local network, and therefore, for instance, with movement of the mobile communication terminal into a third wireless local network, only one connection to the second local network has to be used.

In a further embodiment variant, one or more, or all, access point units and the local switching unit assigned to an access point unit are combined in each case into a switching device, and used as the device-specific address is the Media Access Control (MAC) address of the wireless local network. This embodiment variant has the advantage, among other things, that commercially available switching devices can be used, and, with the MAC address, a standardized device-specific address.

In a further embodiment variant, the bordering local network switching units are connected to each other via layer 2 tunnel connections (Layer 2 Tunnel Protocol or L2TP), and the mobile communication terminal is registered in a first virtual local network via the first access point unit. After the mobile communication terminal has been moved to a new location, and after transmission of the second Internet address, the mobile communication terminal is registered in a second virtual local network, via the second access point unit, and deregistered in the first virtual local network. This embodiment variant has the advantage, among other things, that with the use of virtual networks a widespread technology can be used.

In a further embodiment variant, access of the mobile communication terminal to an Internet network from the access point unit, from the local network switching unit and/or from the Internet switching unit is checked via security keys, via policies and/or via one or more authentication methods. This embodiment variant has the advantage, among other things, that a mobile communication terminal can be identified and the access to an Internet network can be billed, for instance.

In a further embodiment variant, the access point unit, the local network switching unit and/or the Internet switching unit is checked by the mobile communication terminal via security keys, via policies and/or via one or more authentication methods. This embodiment variant has the advantage, among other things, that the mobile communication terminal can identify network elements and can establish access to an Internet network e.g. only with respect to certain providers.

BRIEF DESCRIPTION OF THE DRAWINGS

An embodiment of the present invention will be described in the following with reference to an example. The example of the embodiment is illustrated by FIGS. 1 to 4.

DETAILED DESCRIPTION OF THE INVENTION

Figure 1:
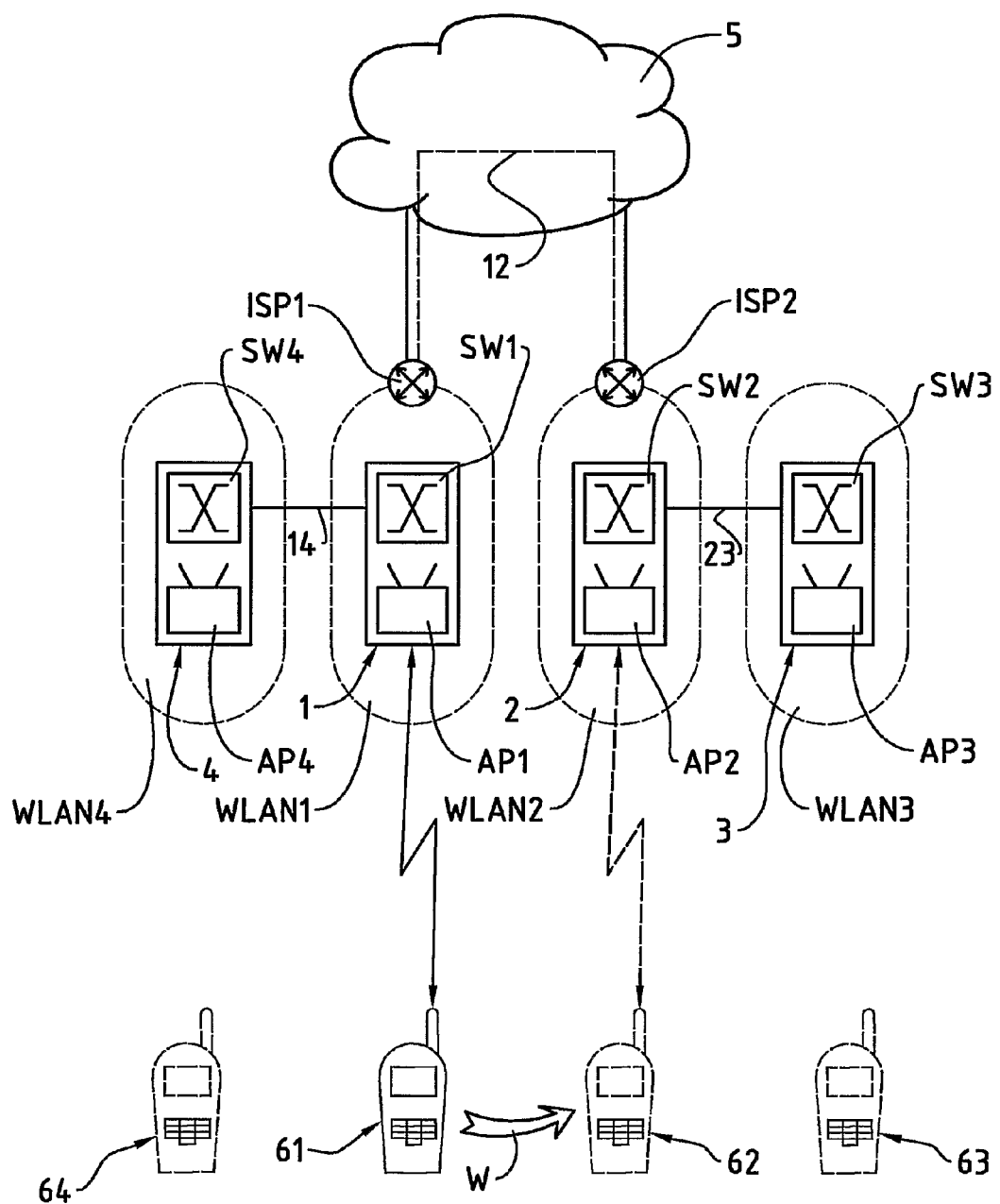
FIG. 1 shows a block diagram representing schematically wireless local networks and a mobile communication terminal, the mobile communication terminal moving in step W from the wireless local network WLAN1 to the wireless local network WLAN2.

In FIG. 1, the reference numeral 61 refers to a wireless communication terminal, for example a laptop or palmtop computer, for instance a so-called Personal Digital Assistant (PDA), or a mobile telephone. The wireless communication terminal 61 comprises a communication module for data communication via a wireless local network, a so-called WLAN (Wireless Local Area Network). The wireless local network is preferably based on radio waves, for example according to the standard IEEE 802.11 (Institute of Electrical and Electronics Engineers) or according to a standard for a piconet, e.g. according to the standard known by the name Bluetooth. It can also be based on infrared, however. Subsequently, the terms mobile communication terminal 61 and moved mobile communication terminal 62, 63, 64 are used, whereas the mobile communication terminal 61 is initially located at a first location and whereas, through a movement W from the first to the second location, the moved mobile communication terminal 62, 63, 64 is located at a second location.

As shown in FIG. 1, because of the limited range of wireless local networks, a plurality of access point units, so-called Access Points (APs), are set up in a distributed way, to enable access to an Internet network via wireless local networks over larger geographic areas. Illustrated in FIG. 1, by way of example, are four access point units AP1, AP2, AP3 and AP4; the present invention relates, however, to configurations with any desired number of access point units and any desired number of (subsequently shown) corresponding units, devices and similar components. Each access point unit is assigned to a corresponding local switching unit. In the example of FIG. 1 these are the local switching units SW1, SW2, SW3 and SW4.

Access point unit and local switching unit can be separate units which are connectable to each other via a data connection, or access point unit and local switching unit can be combined into a single device. In the case of a single device, access point unit and local switching unit form the so-called switching device. In FIG. 1 these are the switching devices 1, 2, 3 and 4. It is obvious that a switching device can be replaced by an access point unit and a local switching unit. A switching device is assigned a corresponding wireless local network. In FIG. 1 these are the wireless local networks WLAN1, WLAN2, WLAN3 and WLAN4.

Local switching units can be connected to one another via a physical network cable, such as e.g. the Ethernet. Local switching units can also be connected to one another via Internet switching units and an Internet network, however. In FIG. 1, the reference numerals 14 and 23, respectively, refer to direct connections via physical networks that connect the local switching units SW1 and SW4 or SW2 and SW3, respectively. The reference symbols ISP1 and ISP2, respectively, in FIG. 1 refer to Internet switching units that connect the local switching units SW1 and SW2, respectively, via an Internet network 5.

In the case of connection of local switching units via an Internet network, it can be advantageous to achieve this connection wholly or partially as a so-called layer 2 tunnel connection (Layer 2 Tunnel Protocol or L2TP). In FIG. 1, the reference numeral 12 refers to a layer 2 tunnel connection between the Internet switching units ISP1 and ISP2. A layer 2 tunnel connection can also be achieved, however, between local switching units, such as e.g. between the local switching unit SW1 and the local switching unit SW2.

The reference numeral 61 in FIG. 1 refers to the mobile communication terminal which is connected wirelessly to the access point unit AP1. The step W refers to the movement of the mobile communication terminal from a first wireless local network WLAN1 into a further wireless local network WLAN2. The reference numeral 62, 63, 64 refers to the moved communication terminal (i.e. after the mobile communication terminal has been moved according to step W), which is wirelessly connected to one of the access point units AP2, AP3, AP4.

Figure 2:
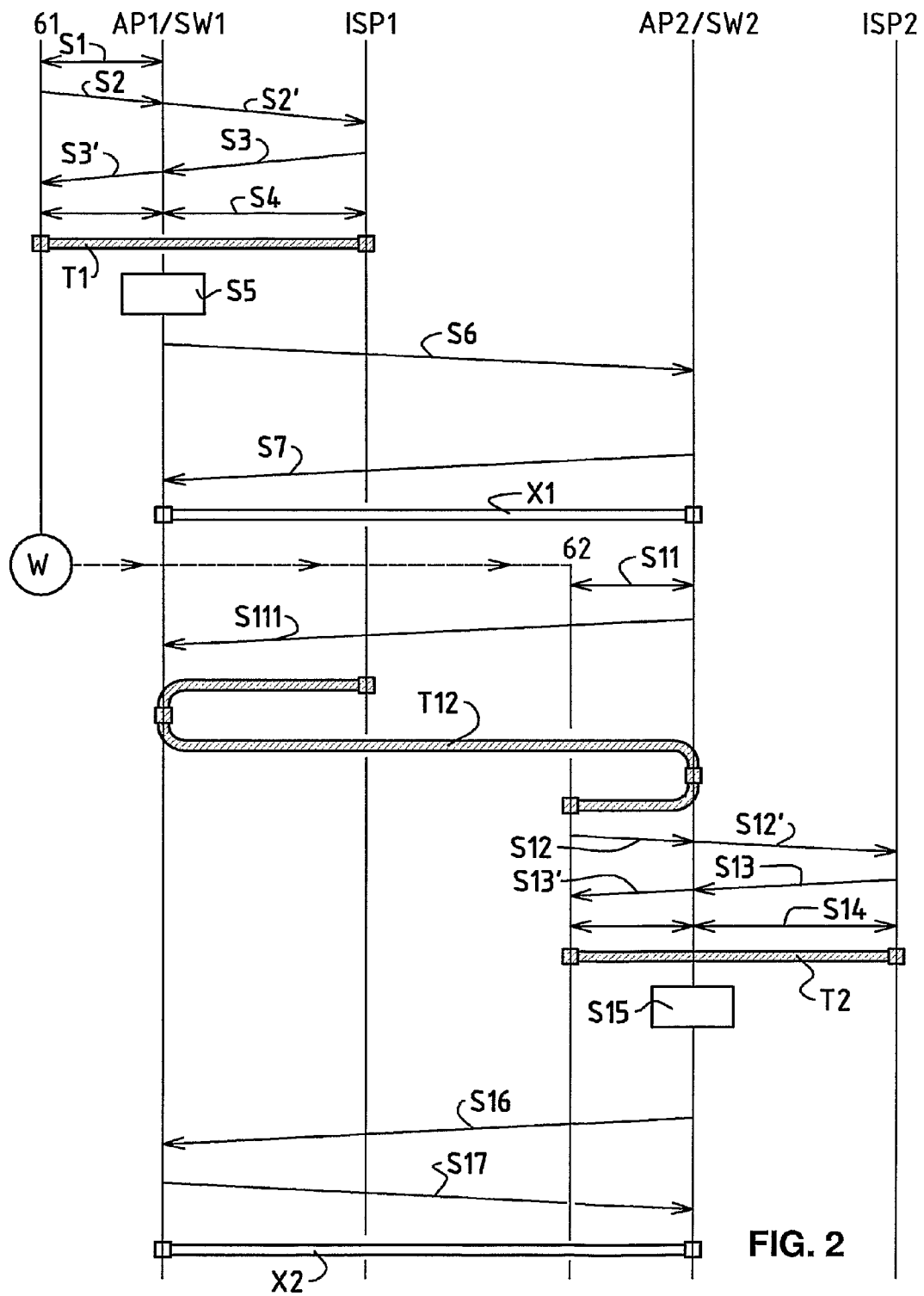
FIG. 2 shows a block diagram illustrating schematically a possible sequence of steps for access of a mobile communication terminal via wireless local networks.

In FIG. 2, the reference numeral 61 refers to the mobile communication terminal. The reference symbol AP1/SW1 refers to a first switching unit, comprising a first access point unit AP1 and a first local network switching unit SW1. The reference symbol AP2/SW2 refers to a second switching unit, comprising a second access point unit AP2 and a second local network switching unit SW2. The reference symbol ISP1 refers to a first Internet switching unit, and the reference symbol ISP2 refers to a second Internet switching unit.

In step S1, a one-sided or a mutual recognition is carried out between the mobile communication terminal 61 and the switching device AP1/SW1. In step S2, the mobile communication terminal 61 transmits to the switching device AP1/SW1 a request for granting access to an Internet network.

Figure 3:
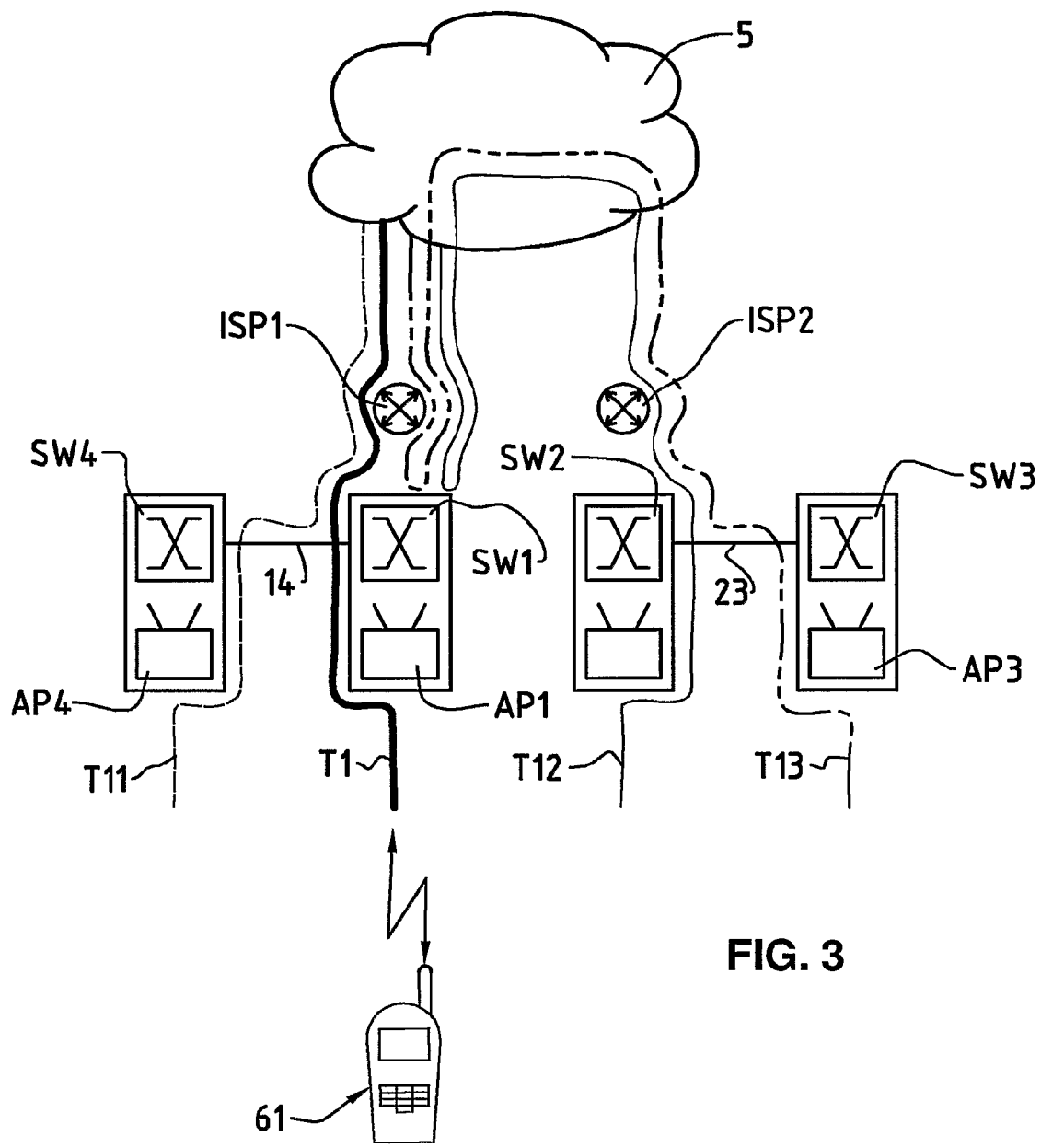
FIG. 3 shows a block diagram illustrating schematically a first access T1 and a plurality of further accesses T12, T13, T14 for the mobile communication terminal using a first Internet address.

In a step S2', the switching device AP1/SW1 forwards this request to the Internet switching unit ISP1. In a step S3, the Internet switching unit ISP1 transmits a first Internet address for the mobile communication terminal to the switching device AP1/SW1. The switching device AP1/SW1 transmits this first Internet address to the mobile communication terminal 61 a step S3'. As depicted in FIG. 3, in a step S4, the mobile communication terminal 61, the switching device AP1/SW1 and the Internet switching unit ISP1 agree on suitable settings and provide an access T1 for the mobile communication terminal to an Internet network 5. In step S5, the switching device AP1/SW1 registers a device-specific address for the mobile communication terminal 61. Together with a network identification for the wireless local network WLAN1 assigned to the switching device AP1/SW1, the device-specific address is transmitted to bordering further switching devices AP2/SW2 . . . APn1/SWn1, and is registered in these further switching devices AP2/SW2 . . . APn1/SWn1, in step S6. In step S7, the switching device AP2/SW2 transmits a request for establishing a two-way connection to the switching device AP1/SW1. The switching devices AP1/SW1 and AP2/SW2 then establish a connection X1 for mutual data exchange.

In step W the mobile communication terminal 61 is moved from the switching device AP1/SW1 to the switching device AP2/SW2. The reference numeral 62 designates the moved mobile communication terminal.

Figure 4:
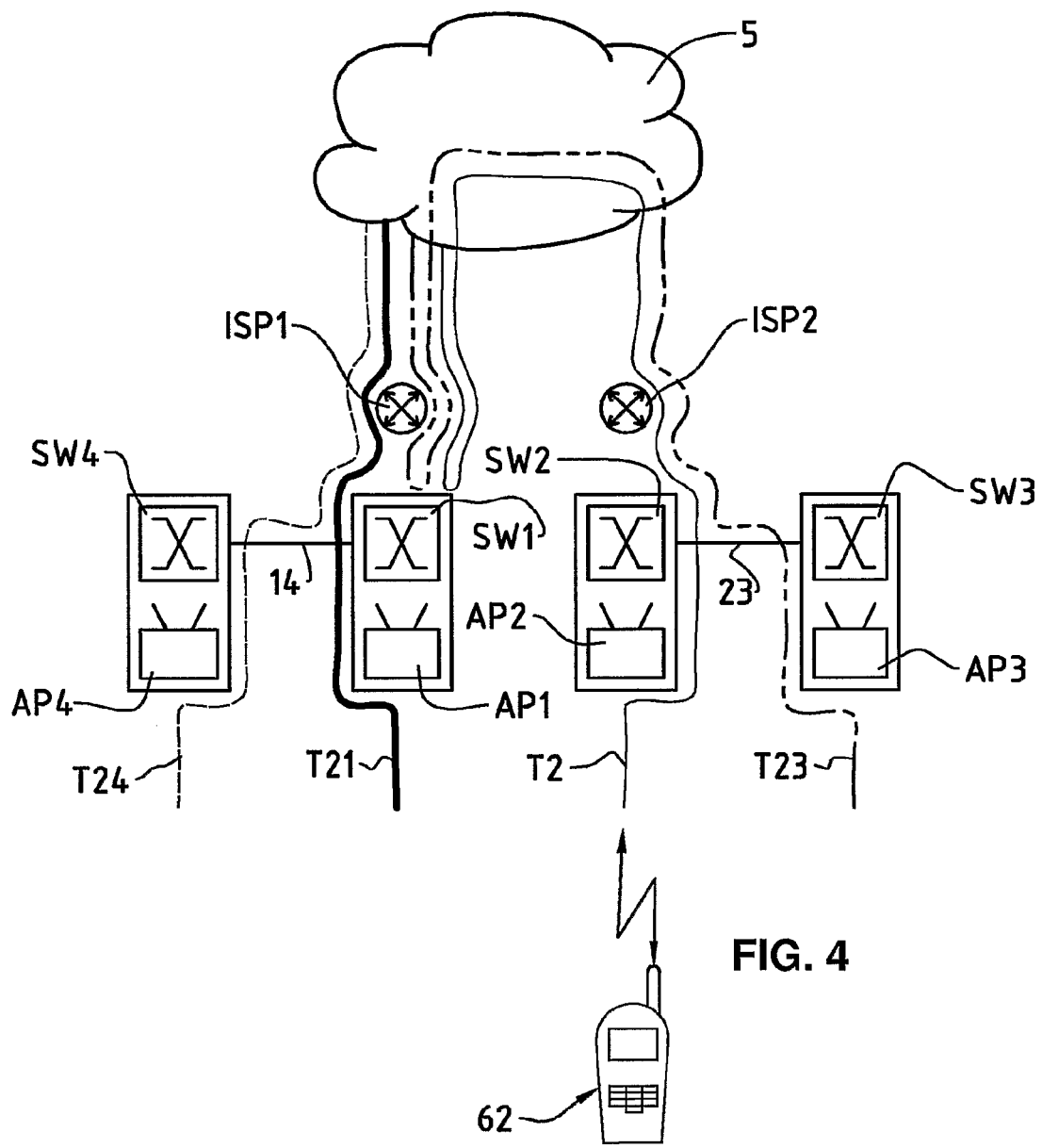
FIG. 4 shows a block diagram illustrating schematically a second access T2 and a plurality of further accesses T21, T23, T24 for the mobile communication terminal using a second Internet address.

In step S11, a two-way recognition is carried out between the mobile communication terminal 62 and the switching device AP2/SW2. In step S111, the switching device AP2/SW2 sends a command to the switching device AP1/SW1 to use the connection X1 in order to form the connection T12 shown in FIG. 3, whereby access for the mobile communication terminal 62 (shown in FIG. 4) to an Internet network, via the switching device AP2/SW2, via the switching device AP1/SW1, via the Internet switching unit ISP1 is provided. FIG. 3 further shows that connections T11 and T13 are also provided via switching devices AP4/SW4 and AP3/SW3 respectively. As depicted in FIG. 4, in step S12, the mobile communication terminal 62 transmits a request to the switching device AP2/SW2 for grant of access to an Internet network 5. In a step S12', the switching device AP2/SW2 forwards this registration request to the Internet switching unit ISP2. In a step S13, the Internet switching unit ISP2 transmits to the switching device AP2/SW2 a second Internet address for the mobile communication terminal. The switching device transmits this second Internet address to the mobile communication terminal in a step S13'. In a step S14, the mobile communication terminal 62, the switching device AP2/SW2 and the Internet switching unit ISP2 agree on suitable settings and provide a connection T2 for access for the mobile communication terminal to an Internet network. The connection T2 can then be established. In step S15 the switching device AP2/SW2 registers the device-specific address for the communication terminal 62. In step S16, together with a network identification for the wireless local network WLAN2, assigned to the switching device AP2/SW2, the device-specific address is transmitted to further switching devices AP1/SW1 . . . APn2/SWn2 and is registered in these further switching devices AP1/SW1 . . . APn2/SWn2. In step S17, the switching device AP2/SW2 transmits a request for providing a two-way connection to the switching device AP1/SW1. The switching devices AP1/SW1 and AP2/SW2 then establish a connection X2 for mutual data exchange and form the connection T21 as shown in FIG. 4. FIG. 4 further shows that connections T24 and T23 are also provided via switching devices AP4/SW4 and AP3/SW3 respectively.

With this method the mobile communication terminal can be moved from a first wireless local network to a subsequent wireless local network, the WLAN handover taking place efficiently and in a robust manner. In particular, the WLAN handover also take place efficiently between different network segments of different network providers. Moreover, network providers may easily provide wireless access to each others customers, whereas billing of such access may be provided by measurement of data traffic passing from one network provider to customers of another network provider.

The invention claimed is:

1. A method for providing access for a mobile communication terminal and the mobile communication terminal at a moved location to an Internet network via wireless local area networks, comprising:

registering in a first Internet switching unit the mobile communication terminal via a first access point unit of a first wireless local network and via a first local network switching unit connected to the first access point unit;

transmitting a first Internet address from the first Internet switching unit to the mobile communication terminal;

providing a first access for the mobile communication terminal to the Internet network, using the first Internet address, whereas the first access is via the first access point unit, via the first local network switching unit, and via the first Internet switching unit; and registering in the first local network switching unit a device-specific address of the mobile communication terminal;

while the mobile communication terminal still accesses the Internet network via the first access point, transmitting the registered device-specific address and a network identification for the first wireless local network from the first local network switching unit to a plurality of bordering further local network switching units;

receiving a request from each of the plurality of bordering further local network switching units to the first local network switching unit to establish a connection with the first local network switching unit; and while the mobile communication terminal still accesses the Internet network via the first access point, and in response to the request from each of the plurality of bordering further local network switching units, configuring the plurality of bordering further local network switching units for providing a plurality of further accesses for the mobile communication terminal to the Internet network using the first Internet address via a plurality of further access point units and corresponding further bordering local network switching units, via the first local network switching unit and via the first Internet switching unit, wherein a respective further access point of the plurality of further access points provides the mobile communication terminal a further access to the Internet network when the mobile communication terminal moves to a location corresponding to the respective further access point.

2. A method according to claim 1, wherein routing in the first local network switching unit of data packets from the Internet network to the first access or to the further accesses is adapted according to data packets of the mobile terminal or the moved mobile terminal received from the first access to the Internet network or from the further accesses to the Internet network.

3. A method according to claim 1, wherein after the mobile communication terminal moves to a new location, the mobile communication terminal is registered with a second Internet switching unit via a second access point unit of a second wireless local network and via a second local network switching unit connected to the second access point unit,
wherein a second Internet address is transmitted from the second Internet switching unit to the moved mobile communication terminal,
wherein a second access for the mobile communication terminal to the Internet network is provided, using the second Internet address, via the second access point unit, via the second local network switching unit, and via the second Internet switching unit,
wherein the device-specific address of the moved mobile communication terminal is registered in the second local network switching unit,
wherein the registered device-specific address and a network identification for the second wireless local network are transmitted from the second local network switching unit to a plurality of bordering further local network switching units, and
wherein the plurality of bordering further local network switching units are configured for providing a plurality of further accesses for the mobile communication terminal at a moved location to the Internet network using the second Internet address, whereas the plurality of further accesses is via a plurality of further access point units and corresponding further bordering local network switching units, via the second local network switching unit and via the second Internet switching unit.

4. A method according to claim 3, wherein the bordering local network switching units are connected together via layer two tunnel connections, wherein the mobile communication terminal is registered in a first virtual local network via the first access point unit, wherein, after transmission of the second Internet address, the moved mobile communication terminal is registered in a second virtual local network via the second access point unit, and wherein the moved mobile communication terminal is deregistered in the first virtual local network.

5. A method according to claim 3, wherein the bordering local network switching units are connected together via physical network cables by using a MAC-address based protocol, wherein the mobile communication terminal is registered in a first virtual local network via the first access point unit, wherein, after transmission of the second Internet address, the moved mobile communication terminal is registered in a second virtual local network via the second access point unit, and wherein the moved mobile communication terminal is deregistered in the first virtual local network.

6. A method according to claim 1, wherein access point units and corresponding local network switching units are used that are disposed jointly in switching devices and a media access control address is used as the device-specific address.

7. A method according to claim 1, wherein the access of the mobile communication terminal to an Internet network is checked by the first access point unit, by the first local network switching unit or by the first Internet switching unit using security keys, policies and/or one or more authentication methods.

8. A method according to claim 1, wherein at least one of the first access point unit, the first local network switching unit, or the first Internet switching unit is checked by the mobile communication terminal using security keys, policies or one or more authentication methods.

9. A system for providing access for a mobile communication terminal and the mobile communication terminal at a moved location to an Internet network via wireless local networks, comprising:
a module for registering in a first Internet switching unit the mobile communication terminal via a first access point unit of a first wireless local network and via a first local network switching unit connected to the first access point unit;
a module for transmitting a first Internet address from the first Internet switching unit to the mobile communication terminal;
a module for providing a first access for the mobile communication terminal to the Internet network, using the first Internet address, whereas the first access is via the first access point unit, via the first local network switching unit, and via the first Internet switching unit;
a module for registering in the first local network switching unit a device-specific address for the mobile communication terminal;
a module for transmitting, while the mobile communication terminal still accesses the Internet network via the first access point, the registered device-specific address and a network identification for the first wireless local network from the first local network switching unit to a plurality of bordering further local network switching units; and
a module for receiving a request from each of the plurality of bordering further local network switching units to the first local network switching unit to establish a connection with the first local network switching unit; and
a module for configuring, while the mobile communication terminal still accesses the Internet network via the first access point, and in response to the request from each of the plurality of bordering further local network switching units, the plurality of bordering further local network switching units for providing a plurality of further accesses for the mobile communication terminal to the Internet network using the first Internet address via a plurality of further access point units and corresponding further bordering local network switching units, via the first local network switching unit, and via the first Internet switching unit, wherein a respective further access point of the plurality of further access points provides the mobile communication terminal a further access to the Internet network when the mobile communication terminal moves to a location corresponding to the respective further access point.

10. A system according to claim 9, wherein the first local network switching unit comprises a module for routing of data packets from the Internet network to the first access or to the further accesses according to data packets of the mobile terminal or the moved mobile terminal received from the first access to the Internet network or from the further accesses to the Internet network.

11. A system according to claim 9, wherein the system further comprises a module adapted to register the mobile communication terminal, after it moves to a new location, with a second Internet switching unit via a second access point unit of a second wireless local network and via a second local network switching unit connected to the second access point unit,
wherein the system further comprises a module adapted to transmit a second Internet address from the second Internet switching unit to the moved mobile communication terminal,
wherein the system further comprises a module adapted to provide a second access for the mobile communication terminal to the Internet network, using the second Internet address, via the second access point unit, via the second local network switching unit, and via the second Internet switching unit,
wherein the system further comprises a module adapted to register the device-specific address of the moved mobile communication terminal in the second local network switching unit,
wherein the system further comprises a module adapted to transmit the registered device-specific address and a network identification for the second wireless local network from the second local network switching unit to a plurality of bordering further local network switching units, and
wherein the system further comprises a module adapted to configure the plurality of bordering further local network switching units for providing a plurality of further accesses for the mobile communication terminal at a moved location to the Internet network using the second Internet address, whereas the plurality of further accesses is via a plurality of further access point units and corresponding further bordering local network switching units, via the second local network switching unit, and via the second Internet switching unit.

12. A system according to claim 11, wherein bordering local network switching units are connected together via layer two tunnel connections, and wherein the system further comprises a module adapted to register the mobile communication terminal in a first virtual local network via the first access point unit, wherein the system further comprises a module adapted to register, after transmission of the second Internet address, the moved mobile communication terminal in a second virtual local network via the second access point unit, and wherein the system further comprises a module adapted to deregister the moved mobile communication terminal in the first virtual local network.

13. A system according to claim 11, wherein bordering local network switching units are connected together via physical network cables by using a MAC-address based protocol, wherein the system further comprises a module adapted to register the mobile communication terminal in a first virtual local network via the first access point unit, wherein the system further comprises a module adapted to register, after transmission of the second Internet address, the moved mobile access point unit, and wherein the system further comprises a module adapted to deregister the moved mobile communication terminal in the first virtual local network.

14. A system according to claim 9, wherein the system further comprises access point units and corresponding local network switching units that are disposed jointly in switching devices and the device-specific address is a media access control address.

15. A system according to claim 9, wherein the system further comprises a module adapted to check, by using security keys, policies and/or one or more authentication methods, the access of the mobile communication terminal to an Internet network from the first access point unit, from the first local network switching unit, or from the first Internet switching unit.

16. A system according to claim 9, wherein the system further comprises a module adapted to check, by using security keys, policies or one or more authentication methods, at least one of the first access point unit, the first local network switching unit, or the first Internet switching unit from the mobile communication terminal.

17. A local network switching unit for providing access for a mobile communication terminal and for the mobile communication terminal at a moved location to an Internet network via a wireless local area network, comprising:
a module for registering in an Internet switching unit the mobile communication terminal via an access point unit of the wireless local network and via the local network switching unit connected to the access point unit;
a module for transmitting an Internet address from the Internet switching unit to the mobile communication terminal;
a module for providing a first access for the mobile communication terminal to the Internet network, using the Internet address, whereas the first access is via the access point unit, via the local network switching unit, and via the Internet switching unit;
a module for registering in the local network switching unit a device-specific address for the mobile communication terminal;
a module for transmitting, while the mobile communication terminal still accesses the Internet network via the first access point, the registered device-specific address and a network identification for the wireless local network from the local network switching unit to a plurality of bordering further local network switching units;
a module for receiving a request from each of the plurality of bordering further local network switching units to the first local network switching unit to establish a connection with the first local network switching unit; and
a module for configuring, while the mobile communication terminal still accesses the Internet network via the first access point, and in response to the request from each of the plurality of bordering further local network switching units, the plurality of bordering further local network switching units for providing a plurality of further accesses for the mobile communication terminal to the Internet network using the Internet address via a plurality of further access point units and corresponding further bordering local network switching units, via the local network switching unit, and via the Internet switching unit, wherein a respective further access point of the plurality of further access points provides the mobile communication terminal a further access to the Internet network when the mobile communication terminal moves to a location corresponding to the respective further access point.

18. Local network switching unit according to claim 15, wherein the local network switching unit comprises a module for routing of data packets from the Internet network to the first access or to the further accesses according to data packets of the mobile terminal or the moved mobile terminal received from the access to the Internet network or from the further accesses to the Internet network.

19. A local network switching unit according to claim 15, wherein the local network switching unit and the access point unit connected to the local network switching unit are disposed jointly in a switching device and the device-specific address is a media access control address.

* * * * *